Jan. 26, 1960                G. H. PRIMEAU                2,922,315
                            TRANSMISSION CONTROL
Filed Nov. 29, 1957                                    2 Sheets-Sheet 1

INVENTOR.
George H. Primeau
BY
W. C. Middleton
ATTORNEY

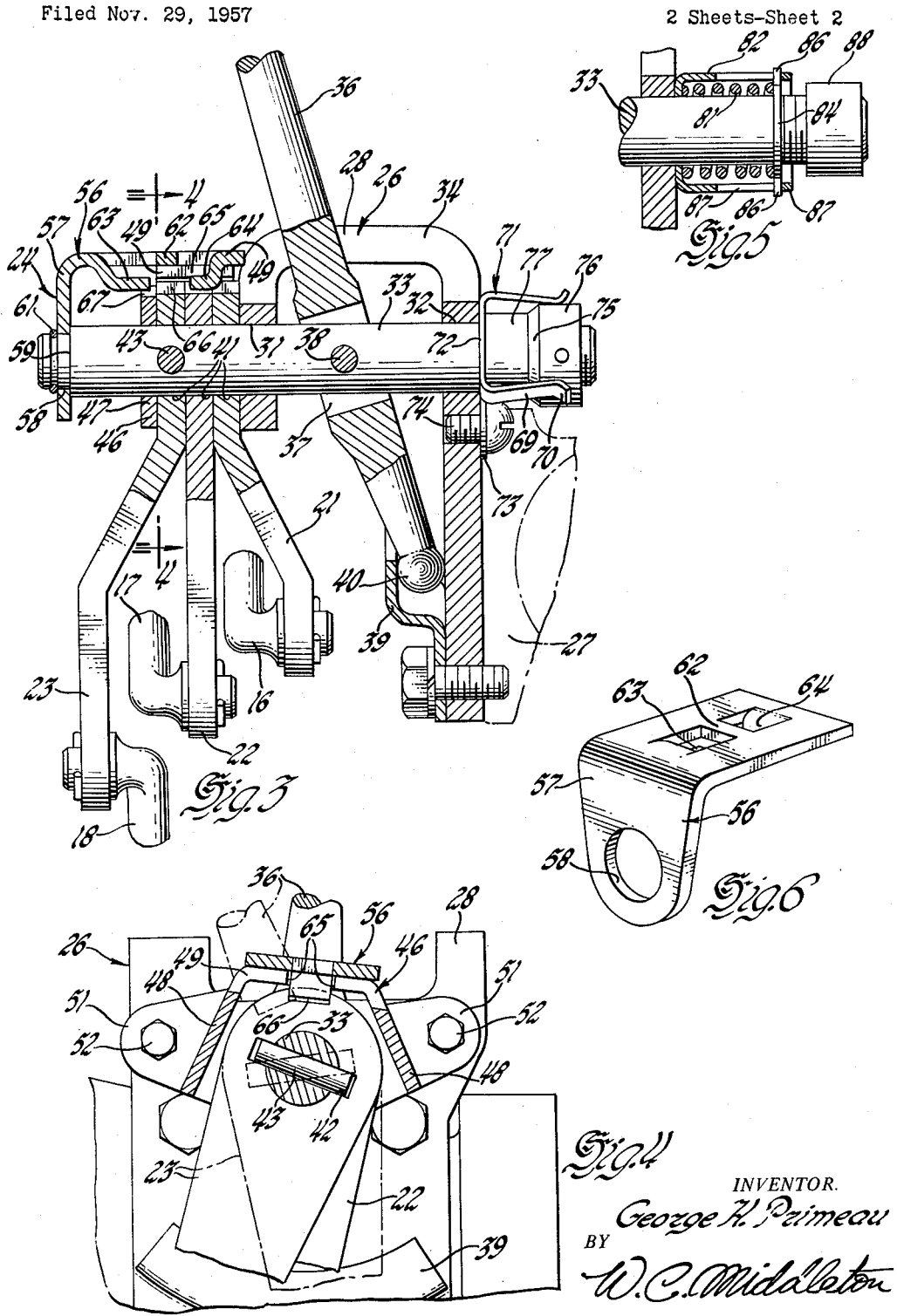

United States Patent Office 2,922,315
Patented Jan. 26, 1960

2,922,315

TRANSMISSION CONTROL

George H. Primeau, Grosse Pointe Farms, Mich., assignor to General Motors Corporation, Detroit, Mich., a corporation of Delaware Application November 29, 1957, Serial No. 699,712

14 Claims. (Cl. 74—473)

This invention relates to a control linkage and more particularly to an interlock transmission control linkage.

This transmission control linkage is adapted for controlling a four-speed and reverse synchromesh transmission of the type shown in the assignee's copending application S.N. 699,714, filed November 29, 1957, for a Transmission by James W. Fodrea. The control linkage is actuated by a hand lever which may be moved laterally to select either the third fourth shift lever or the first second shift lever or the reverse shift lever and then rotated to actuate the lever selected. The hand lever is pivoted to a shaft so that lateral movement of the hand lever which has one end laterally fixed moves the shaft and rotary movement of the hand lever rotates the shaft. The shaft is connected selectively by a pin and slot connection to each of the shift levers. The shift levers also have an interlock recess which cooperates with an interlock cam to lock the other two shift levers in the neutral position when one shift lever is selected for actuation. Movement of the hand lever to reverse to select the reverse shift lever is resisted by a non-biasing spring detent.

An object of the invention is to provide an improved and simplified control linkage for connecting a hand lever selectively to a plurality of shift levers and at the same time blocking the other shift levers in the neutral position.

Another object of the invention is to provide in a transmission control linkage a hand lever mounted on and operating a shaft axially to select one of a plurality of shift levers and including a connection to transfer rotary movement from the hand lever through the shaft to the selected shift lever.

Another object of the invention is to provide a simplified transmission interlock consisting of a stamped guide and cage member supporting and locating the shift levers and a stamped interlock cam operably connected to hold the unselected shift levers in neutral position.

These and other objects of the invention will be more apparent from the following description and drawings of the preferred embodiments of the invention.

Figure 3 is a view similar to Figure 1 showing the linkage in the reverse position.

Figure 4 is a section of Figure 3 on the line 4—4.

Figure 5 shows a modified detent spring.

Figure 6 is a perspective of the interlock cam.

Figure 1:
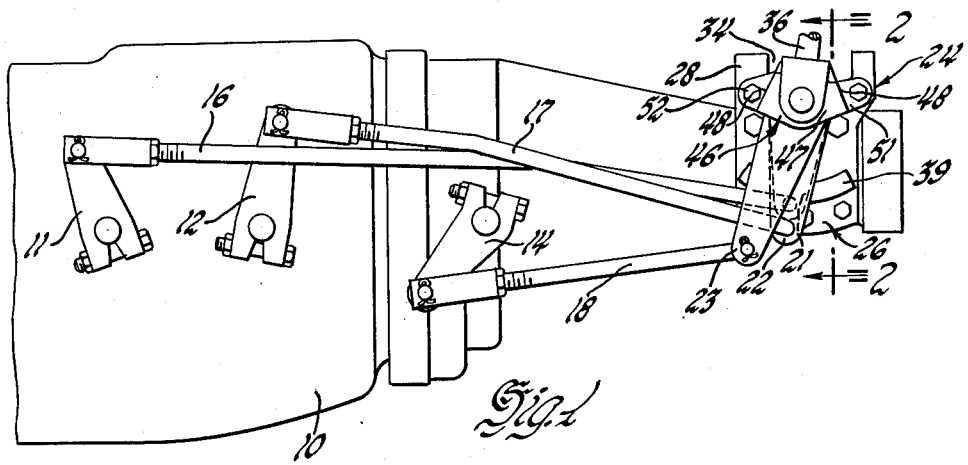
Figure 1 is an elevation view of the transmission and the transmission control linkage.

This transmission control linkage is adapted to control four-speed and reverse synchromesh transmissions of the type shown in the above identified copending application S.N. 699,714. The transmission 10 has a third fourth ratio shift fork operatet by the crank 11, a first second ratio shift fork operated by the crank 12 and a reverse shift fork operated by the crank 14. The cranks 11, 12 and 14 are respectively connected by rods 16, 17 and 18 to the third fourth shift lever 21, the first second shift lever 22 and the reverse shift lever 23 of the control portion 24 of the linkage.

The control portion of the linkage is assembled on a support bracket 26 which may be mounted on a suitable support 27 on the vehicle. The support 26 has at its upper end a U-shaped portion 28 having aligned apertures 31 and 32 in the legs of the U-shaped portion to rotatably support the shaft 33. The base of the U-shaped portion 28 has a large central aperture 34 in which the hand lever 36 is located. The hand lever 36 has an aperture 37 centrally located in the lever fitting around the shaft 33 and is connected to the shaft by a pin 38 for lateral pivotal movement while being rotatably fixed to the shaft. The fulcrum end of the lever 36 has a ball 40 located in an arcuate guide formed by the guide member 39 and the bracket 36. The guide 39 has an arcuate shape having a center coinciding with the center of shaft 33 and provides a fixed fulcrum for lateral pivotal movement of the lever 36 to move the shaft 33 axially while permitting rotary movement of the lever 36 with the shaft 33.

Each of the shift levers 21, 22 and 23 has a central aperture 41 fitting the shaft 33 to rotatably mount the shift levers on the shaft, and a transverse slot 42 which fits the pin 43 secured in the shaft 33. Thus, when the pin 43 is located in the slot 42 of any one of the levers and the hand lever 36 is rotated, that lever is rotated. The shift levers are held in position by a cap-shaped bracket 46 having an end thrust member 47 engaging the outer lever 23 and holding the levers 23, 22 and 21 in engagement with each other and against the outer leg of the U-shaped portion 28 of bracket 26. The end 47 of the bracket 46 is connected by two side wall portions 48 and a top wall portion 49 to a pair of ears 51 extending from the side wall portions 48 which are secured by bolts 52 to the outer leg of the U-shaped portion 28 of bracket 26.

Figure 2:
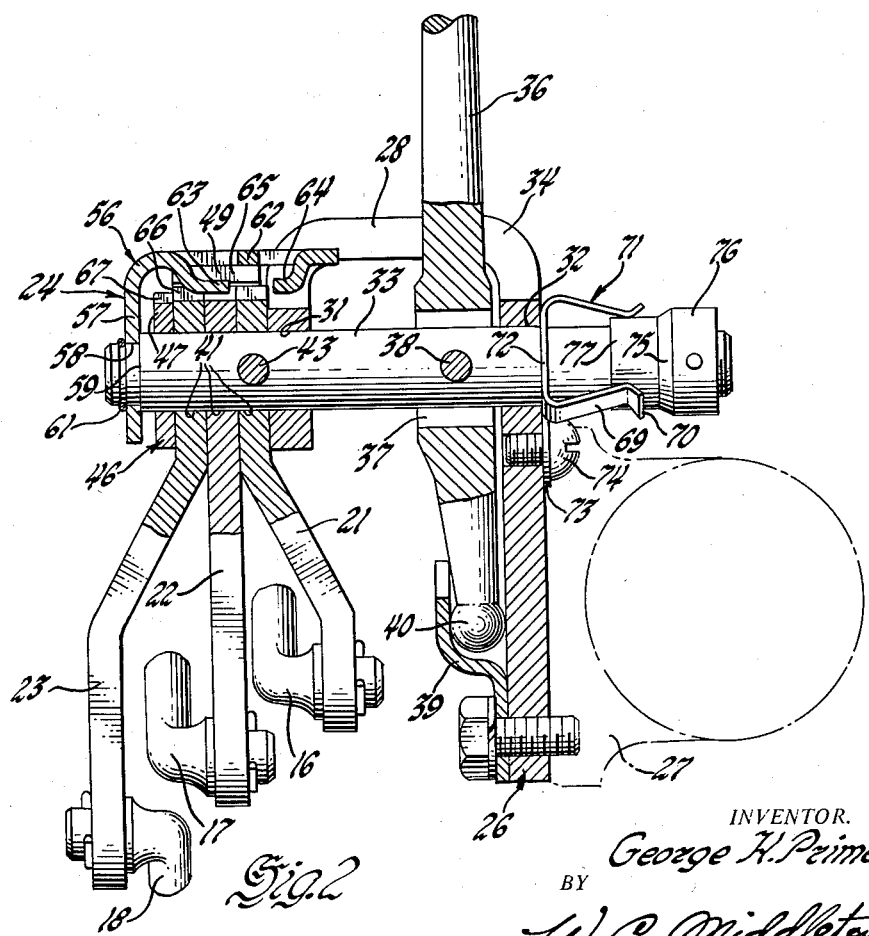
Figure 2 is an enlarged view of the transmission control linkage with parts in section to show details.

An interlock cam 56 shown in Figs. 2, 4 and 6 has a securing flange 57 suitably apertured at 58 to fit over the reduced end of the shaft 33 and is held in engagement with the shoulder 59 by the snap ring 61 to secure the interlock cam to the shaft 33 for axial movement but to permit relative rotary movement. The slide portion 62 of the interlock cam 56 seats and slides on the top of wall 49 of the bracket 46. A first interlock cam 63 and a second interlock cam 64 extend through an axial slot 65 in the top portion 49 preventing lateral movement of the interlock cam. The cams engage recesses 66 in the adjacent end portion of each of the levers 21, 22 and 23. It will be seen that when the control mechanism is in the position illustrated in Fig. 2 for actuating the third fourth ratio lever 21 that the cam 63 prevents movement of the reverse lever 23 and the first second lever 22. When the pin 43 engages the first second lever 22 the cam 63 will prevent movement of the lever 23 and the cam 64 will prevent movement of the lever 21. When the pin 43 engages the reverse lever 23 the cam 64 will be effective to engage the levers 22 and 21. The cam 56 may be held against lateral movement when the first interlock cam 63 leaves the slot 65 since another portion remains in slot 67 in end 47 of bracket 46. Where the transmission contains an interlock between the first second and third fourth shift forks it may not be necessary that the cam 64 engage more than one of these levers in the reverse position.

The control linkage is provided with a detent to resiliently resist movement of the shaft 33 to the position to select the reverse lever 23. Detent employs a three-fingered spring member 71 having a base 72 fitting against bracket 26 and having a tab 73 secured to the bracket by a screw 74. Spring member 71 has the three spring fingers 69 having outwardly extending terminal portions 70 located at a transverse angle to engage the angular sloping surface 75 of the detent cam 76 which is secured to the shaft 33. The cam 76 is threaded on shaft 33 for adjustability and then staked in position. As the shaft 33 is moved from the first second position to reverse position the portion 70 of spring finger 69 must be forced up over the cam surface 75. This provides a resistance to movement of the lever 36 preventing inadvertent shifts to reverse. The cam 76 may also have a sleeve portion 77 on which the spring finger 69 rides at all times to pretension the fingers. The sleeve may also provide a step between the third fourth and the first second positions.

The modified detent shown in Fig. 5, which illustrates the shaft 33 in third fourth position, employs a coil spring 81 located in a cage having a cup-shaped portion 82 fitting around the shaft 33, and a washer 84 having tabs 86 sliding in slots 87 in the cup 82. The spring 81 may have an expanded length as shown or the expanding movement of the spring 81 may be limited by limiting the movement of washer 84 and the tab 86 in the slot in the position shown by having the tab 86 engage a stop 87. The cam abutment 88 which is affixed to shaft 33 will thus move freely from third fourth ratio position to the first second ratio position but will on movement of the first second ratio position to reverse position engage and compress the spring to resist movement to reverse position.

During shifting of the control mechanism, the hand lever 36 is laterally pivoted about the fulcrum 38 to position pin 43 in the slot 42 in one of the levers 21, 22 or 23. At the same time the interlock cam 56 is moved axially with the shaft 33 to position the cams 63, 64 to engage the slot 66 in the other levers and prevent their movement. When the third fourth lever 21 is selected as shown in Fig. 2 the cam 63 is effective to hold the levers 22 and 23 in the neutral position while the hand lever 36 is rotated to rotate the shaft 33 and through the pin 43 the lever 21 to either the third or fourth ratio position. When the hand lever 36 is laterally pivoted about fulcrum ball 40 the pin 43 engages the lever 22 and the cam interlock 56 is moved so that the cam 63 only engages the lever 23 and the cam 64 engages the lever 21 to lock the levers 21 and 23 against rotation. Then the hand lever 36 is rotated to move the lever 22 to either the first or the second ratio position. As shown in Fig. 3, the hand lever 36 may be rotated to the reverse position where the pin 43 actuates the reverse lever 23. In this position the cam 64 engages the levers 21 and 22. Since in most transmissions the first second and third fourth shift levers are interlocked, it may only be necessary to lock one of these levers, since the locking of one of these shift levers locks both the levers 21 and 22. Thus, when the hand lever 36 is rotated to rotate the reverse lever 23 to reverse position, the levers 21 and 22 remain in neutral position.

On movement of the hand lever 36 laterally from the first second ratio position to the reverse position the spring fingers 69 provide a detent resiliently resisting movement of the hand lever only at the point of transfer. However, it will be noted that due to the cam spring arrangement there is no resistance to movement of the hand lever 36 in and between the first second and third fourth ratio positions and there is no resistance to movement in the reverse position. The resistance occurs solely on movement from the first second position to the reverse position. It also will be noted that when the hand lever 36 is in the reverse position the spring 71 does not exert any force tending to move the control linkage out of the reverse position.

The above described embodiments are illustrative of the invention which may be modified by those skilled in the art within the scope of the appended claims.

I claim:

1. In a transmission control linkage, a U-shaped support bracket having a base and legs and a pair of aligned apertures in said legs, a shaft rotatably and slidably mounted in said apertures, a hand lever pivotally connected to said shaft for axial pivotal movement and fixed to said shaft to rotate said shaft, an arcuate fulcrum mounted on the inside surface of one of said legs engaging the fulcrum end of said hand lever to provide an axially fixed fulcrum while permitting rotary movement of said end of said hand lever about said shaft, the other end of said hand lever extending through an opening in said base, a plurality of shift levers rotatably mounted on said shaft outside of said other leg of said U-shaped portion, a bracket secured to said U-shaped portion engaging the opposite surface of said group of levers to locate said levers between said bracket and the adjacent leg portion of said bracket, said shaft being axially movable to a position for each shift lever, and selecting means on said shaft and shift levers to connect said shaft in each position to one shift lever to rotate one shift lever when the shaft is rotated.

2. In a transmission control linkage, a U-shaped support bracket having a base and legs and a pair of aligned apertures in said legs, a shaft rotatably and slidably mounted in said apertures, a hand lever pivotally connected to said shaft for axial pivotal movement and fixed to said shaft to rotate said shaft, an arcuate fulcrum mounted on the inside surface of one of said legs engaging the fulcrum end of said hand lever to provide an axially fixed fulcrum while permitting rotary movement of said end of said hand lever about said shaft, the other end of said hand lever extending through an opening in said base, a plurality of shift levers rotatably mounted on said shaft outside of said other leg of said U-shaped portion, a bracket secured to said U-shaped portion engaging the opposite surface of said group of levers to locate said levers between said bracket and the adjacent leg portion of said bracket, said shaft being axially movable to a position for each shift lever, a pin on said shaft and a slot in said shift levers to connect said shaft in each position to one shift lever to rotate one shift lever when the shaft is rotated, an interlock cam secured to said shaft for axial movement with said shaft, cam members on said interlock cam engaging an axial slot in said bracket to prevent rotary movement of said interlock cam, and said levers having cam recesses, said cam members also engaging said cam recesses in the lever not connected by said selecting means to said shaft.

3. In a transmission control linkage, a U-shaped support bracket having a base and legs and a pair of aligned apertures in said legs, a shaft rotatably and slidably mounted in said apertures, a hand lever pivotally connected to said shaft for axial pivotal movement and fixed to said shaft to rotate said shaft, an arcuate fulcrum mounted on the inside surface of one of said legs engaging the fulcrum end of said hand lever to provide an axially fixed fulcrum while permitting rotary movement of said end of said hand lever about said shaft, the other end of said hand lever extending through an opening in said base, a plurality of shift levers rotatably mounted on said shaft outside of said other leg of said U-shaped portion, a bracket secured to said U-shaped portion engaging the opposite surface of said group of levers to locate said levers between said bracket and the adjacent leg portion of said bracket, said shaft being axially movable to a position for each shift lever, selecting means on said shaft and shift levers to connect said shaft in each position to one shift lever to rotate one shift lever when the shaft is rotated, an interlock cam secured to said shaft for axial movement with said shaft, cam members on said interlock cam engaging an axial slot in said bracket to prevent rotary movement of said interlock cam, and said levers having cam recesses, said cam members also engaging said cam recesses in the lever not connected by said selecting means to said shaft.

4. In a transmission control linkage, a U-shaped support bracket having a base and legs and a pair of aligned apertures in said legs, a shaft rotatably and slidably mounted in said apertures, a hand lever pivotally connected to said shaft for axial pivotal movement and fixed to said shaft to rotate said shaft, an arcuate fulcrum mounted on the inside surface of one of said legs engaging the fulcrum end of said hand lever to provide an axially fixed fulcrum while permitting rotary movement of said end of said hand lever about said shaft, the other end of said hand lever extending through an opening in said base, a plurality of shift levers rotatably mounted on said shaft outside of said other leg of said U-shaped portion, a bracket secured to said U-shaped portion engaging the opposite surface of said group of levers to locate said levers between said bracket and the adjacent leg portion of said bracket, said shaft being axially movable to a position for each shift lever, selecting means on said shaft and shift levers to connect said shaft in each position to one shift lever to rotate one shift lever when the shaft is rotated, an interlock cam secured to said shaft for axial movement with said shaft, cam members on said interlock cam engaging an axial slot in said bracket to prevent rotary movement of said interlock cam, said levers having cam recesses, said cam members also engaging said cam recesses in the lever not connected by said selecting means to said shaft, and detent means to resiliently resist axial movement of said shaft in one direction only.

5. In a transmission control linkage, a U-shaped support bracket having a base portion, a pair of legs, a shaft rotatably and axially slidably supported in a pair of aligned apertures in said legs, a hand lever located between said leg portions and pivotally mounted at one end between said legs for axial pivotal movement while permitting rotary movement of said end about said shaft, said hand lever being centrally pivoted to said shaft for axial pivotal movement and fixed to said shaft to rotate with said shaft, the other end of said hand lever extending through an aperture in said base permitting limited axial and rotary movement of said hand lever, a plurality of shift levers rotatably mounted on said shaft adjacent the outside surface of one leg, a retainer engaging said plurality of levers to axially locate said levers on said shaft between said base portion and said one leg and having a portion secured to said bracket, said hand lever being axially movable to a position corresponding to each lever, and means operatively connecting said shaft in each of said positions to one of said plurality of levers for rotary movement with said shaft.

6. In a transmission control linkage, a U-shaped support bracket having a base portion, a long leg and a short leg, a shaft rotatably and axially slidably supported in a pair of aligned apertures in said legs, a hand lever located between said leg portions and pivotally mounted at one end adjacent the side surface of said long leg for axial pivotal movement while permitting rotary movement of said end about said shaft, said hand lever being centrally pivoted to said shaft for axial pivotal movement and fixed to said shaft to rotate said shaft, the other end of said hand lever extending through an aperture in said base permitting limited axial and rotary movement of said hand lever, a plurality of shift levers rotatably mounted on said shaft adjacent the outside surface of said short leg, a cup-shaped retainer having a base portion apertured to receive said shaft engaging said plurality of levers to axially locate said levers on said shaft between said base portion and said short leg and having side wall portions secured to said short leg, said hand lever being axially movable to a position corresponding to each lever, and means operatively connecting said shaft in each of said positions to one of said plurality of levers for rotary movement with said shaft.

7. In a transmission control linkage, a U-shaped support bracket having a base portion, a long leg and a short leg, a shaft rotatably and axially slidably supported in a pair of aligned apertures in said legs, a hand lever located between said leg portions and pivotally mounted at one end adjacent the side surface of said long leg for axial pivotal movement while permitting rotary movement of said end about said shaft, said hand lever being centrally pivoted to said shaft for axial pivotal movement and fixed to said shaft to rotate said shaft, the other end of said hand lever extending through an aperture in said base permitting limited axial and rotary movement of said hand lever, a plurality of shift levers rotatably mounted on said shaft adjacent the outside surface of said short leg, a cup-shaped retainer having a base portion apertured to receive said shaft engaging said plurality of levers to axially locate said levers on said shaft between said base portion and said short leg and having side wall portions secured to said short leg, said hand lever being axially movable to a position corresponding to each lever, means operatively connecting said shaft in each of said positions to one of said plurality of levers for rotary movement with said shaft, and detent means resiliently resisting axial movement of said shaft in one direction only into one of said positions.

8. In a transmission control linkage, a bracket, a shaft rotatably and slidably mounted on said bracket, a hand lever connected to said shaft to axially move said shaft between a first and second position, a detent spring having a base and a plurality of spring fingers extending substantially perpendicularly from said base, said spring fingers each having a terminal portion, said base of said detent spring having an aperture receiving said shaft, said base being secured to one of said legs, a cam detent member secured to said shaft having a sloped portion and a flat portion positioned axially on said shaft, said terminal portions being biased to resiliently engage said cam detent member and positioned to resist movement in one direction only from said first position to said second position and to provide free movement in either position and from said second position to said first position.

9. In a transmission control linkage, a U-shaped support bracket having a base and legs and a pair of aligned apertures in said legs, a shaft rotatably and slidably mounted in said apertures, a hand lever connected to said shaft to axially move said shaft between a first and second position, a detent spring having a base and a plurality of spring fingers extending substantially perpendicularly from said base, said base of said detent spring having an aperture receiving said shaft, said base being secured to one of said legs, said spring fingers each having a terminal portion biased toward said shaft, a cam detent member secured to said shaft having a sloped portion and a flat portion positioned axially on said shaft with respect to said terminal portions to resist movement in one direction only from said first position to said second position and to provide free movement in either position and from said second position to said first position.

10. In a transmission control linkage, a U-shaped support bracket having a base and legs and a pair of aligned apertures in said legs, a shaft rotatably and slidably mounted in said apertures, a hand lever connected to said shaft to axially move said shaft between a first and second position, a detent spring having a base and a plurality of spring fingers extending substantially perpendicularly from said base, said base of said detent spring having an aperture receiving said shaft, said base being secured to one of said legs, said spring fingers each having a terminal portion biased to engage said shaft, a cam detent member secured to said shaft having a sloped portion between a small and a large diameter flat portion, said sloped portion being positioned axially on said shaft with respect to said terminal portions to resist movement in one direction only from said first position to said second position and to provide free movement from said second position to said first position, and said small diameter flat portion engaging said terminal portions throughout said first position of said shaft and said large diameter flat portion engaging said terminal portions throughout said second position of said shaft.

11. In a transmission control linkage, a bracket having spring abutment means, a shaft rotatably and axially slidably mounted in said bracket, a hand lever connected to said shaft to axially move said shaft between a first and second position, detent means including a detent spring compressible coaxially with respect to said shaft having one end portion engaging said spring abutment means, and cage means engaging opposite end portions and compressing and confining said spring in a prestressed condition to a predetermined maximum length, cam means secured to said shaft and positioned axially on said shaft with respect to said detent means for limited free movement from said first toward said second position without engaging said detent means and then engaging said detent means and moving the other end of said spring to further compress said spring within said cage means to resist further movement from said first position to said second position.

12. In a transmission control linkage, a bracket, a shaft rotatably and axially slidably supported in a pair of aligned apertures in said bracket, arcuate guide means mounted on said bracket located concentrically with respect to said shaft, a hand lever pivotally mounted at one end in said arcuate guide means for axial pivotal movement in any position along said guide means and providing for rotary movement of said end about said shaft in said guide means, said hand lever being centrally pivoted to said shaft for axial pivotal movement and fixed to said shaft to rotate with said shaft, a plurality of shift levers rotatably mounted on said shaft, said bracket including a retainer engaging said plurality of levers to axially locate said levers on said shaft, said hand lever being axially movable to a position corresponding to each lever, and means operatively connecting said shaft in each of said positions to one of said plurality of levers for rotary movement with said shaft.

13. In a transmission control linkage, a bracket, a shaft rotatably and axially slidably supported in a pair of aligned apertures in said bracket, a hand lever pivotally mounted on said bracket for axial pivotal movement and rotary movement, said hand lever being pivoted to said shaft to rotate and reciprocate said shaft, a plurality of shift levers rotatably mounted on said shaft, said bracket including a retainer engaging said plurality of levers to axially locate said levers on said shaft, said hand lever being axially movable to a position corresponding to each lever, means operatively connecting said shaft in each of said positions to one of said plurality of levers for rotary movement with said shaft, and means mounted on said bracket and controlled by said shaft to nonrotatably hold the other levers.

14. In a transmission control linkage, a bracket, a shaft rotatably and axially slidably supported in a pair of aligned apertures in said bracket, arcuate guide means mounted on said bracket locating concentrically with respect to said shaft, a hand lever pivotally mounted at one end in said arcuate guide means for axial pivotal movement in any position along said guide means and providing for rotary movement of said end about said shaft in said guide means, said hand lever being centrally pivoted to said shaft for axial pivotal movement and fixed to said shaft to rotate with said shaft, a plurality of shift levers rotatably mounted on said shaft, said bracket including a retainer engaging said plurality of levers to axially locate said levers on said shaft, said hand lever being axially movable to a position corresponding to each lever, means operatively connecting said shaft in each of said positions to one of said plurality of levers for rotary movement with said shaft, and means mounted on said bracket and axially moved by said shaft to nonrotatably hold the other levers.

References Cited in the file of this patent

UNITED STATES PATENTS

| | | | |
|---|---|---|---|
| 2,180,579 | Butzbach | Nov. 21, | 1939 |
| 2,185,830 | Burt | Jan. 2, | 1940 |
| 2,193,230 | Ferguson | Mar. 12, | 1940 |
| 2,230,847 | Pickett | Feb. 4, | 1941 |
| 2,235,975 | Best | Mar. 25, | 1941 |
| 2,489,735 | Zancan | Nov. 29, | 1949 |
| 2,631,467 | Lincoln et al. | Mar. 17, | 1953 |
| 2,792,717 | Adams | May 12, | 1957 |
| 2,838,951 | Dick | June 17, | 1958 |